United States Patent [19]
Dombeck et al.

[11] Patent Number: 4,971,219
[45] Date of Patent: Nov. 20, 1990

[54] FUEL TANK CAP

[75] Inventors: Wayne L. Dombeck, Wauwatosa; Heinz Gund, Brookfield, both of Wis.

[73] Assignee: Briggs & Stratton Corporation, Milwaukee, Wis.

[21] Appl. No.: 399,263

[22] Filed: Aug. 25, 1989

[51] Int. Cl.$^5$ .............................................. B65D 51/16
[52] U.S. Cl. ................................... 220/303; 220/366; 220/373; 220/374; 220/DIG. 33; 215/307
[58] Field of Search ............... 220/303, 366, 367, 373, 220/374, DIG. 33; 215/261, 307

[56] References Cited

U.S. PATENT DOCUMENTS

| | | | |
|---|---|---|---|
| 1,339,485 | 5/1920 | Stranahan | 220/303 |
| 1,436,738 | 11/1922 | Underhill | 215/307 |
| 1,724,346 | 8/1929 | Ford | 220/303 |
| 3,041,837 | 7/1962 | Jacoby | 220/373 X |
| 3,072,284 | 1/1963 | Luhman, Jr. | 220/374 |
| 3,961,724 | 6/1976 | Kapsy | 220/371 |
| 4,094,437 | 6/1978 | Hayashida | 220/374 |
| 4,165,816 | 8/1979 | Tupper | 220/303 X |
| 4,168,012 | 9/1979 | Hawkinson | 220/374 X |
| 4,285,440 | 8/1981 | Adams | 220/303 X |
| 4,512,499 | 4/1985 | Uuskallio | 220/374 |

Primary Examiner—Stephen Marcus
Assistant Examiner—Nova Stucker
Attorney, Agent, or Firm—Andrus, Sceales, Starke & Sawall

[57] ABSTRACT

A removable cap for closing the filler neck of a fuel tank for an internal combustion engine. The cap includes a one piece gasket and baffle member which not only provides a fluid seal between the cap and the filler neck, but also permits venting of the fuel tank through the gasket. The one piece member includes an annular flat gasket portion integrally formed on the outer periphery of a dome-shaped baffle member projecting downwardly from the inner surface of the cap. Venting is accomplished by means of at least one vent opening extending through the dome-shaped baffle member which in turn communicates via a vent chamber to a passageway formed through the gasket. The passageway in turn communicates with a non-sealing threaded interconnection between the cap and filler neck. A splash guard is also located beneath the baffle member to aid in preventing fuel from splashing through the vent openings in the baffle member.

21 Claims, 2 Drawing Sheets

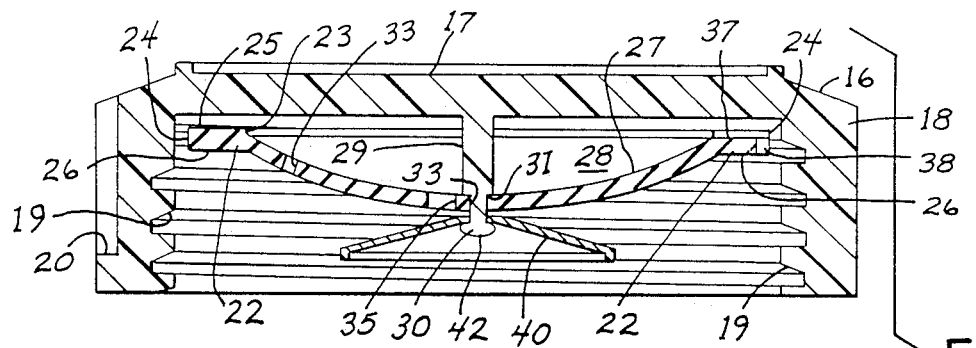
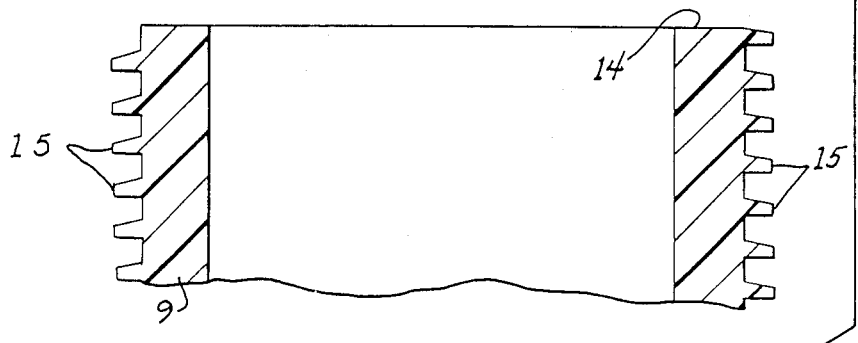
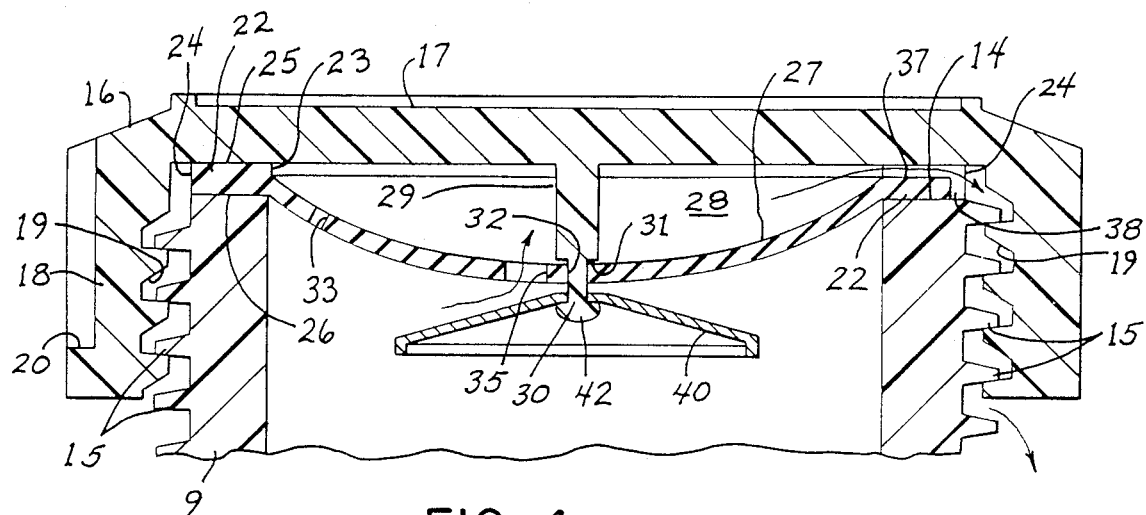
FIG. 3
FIG. 4

FUEL TANK CAP

BACKGROUND OF THE INVENTION

The present invention relates to a fitting for closing the end of a tube, and more particularly to a cap for closing the filler neck of a fuel tank for an internal combustion engine.

Tanks for holding, transporting or storing fuel are typically made in various shapes and sizes. In general, however, such tanks include a filler neck projecting therefrom which is employed to replenish the tank with fuel. Such filler necks generally consist of an upstanding rigid circular rim which must be closed off by a removable cap in order to prevent the fuel from splashing or spilling out of the tank during use. Such caps are also typically employed to vent the fuel tank. Often times venting is accomplished merely by a small aperture formed through the cap. However, various other types of venting arrangements are also known.

SUMMARY OF THE INVENTION

A fuel tank assembly for an internal combustion engine includes a fuel tank having a filler neck with a generally circular upper rim, a removable cap for closing the filler neck having a cover plate and a generally circular lower rim, means on the upper and lower rims for removably interlocking the cap on the fuel tank filler neck by relative interlocking movement between the cap and filler neck, a gasket interposed between the upper rim and the cap for providing a fluid seal therebetween, means for mounting the gasket on the cap, and means for venting the fuel tank through the gasket.

In one form, the gasket includes an annular member having circular inner and outer peripheral surfaces, an upper surface engageable with the cap and a lower surface engageable with the upper rim of the filler neck, and the venting means comprises a passageway formed through the gasket communicating between the inner and outer peripheral surfaces thereof. In another form, the annular gasket is flat in shape and is integral with a baffle member which functions to deflect fuel away from the passageway. The gasket and baffle member thus form a one piece member which not only provides a fluid seal between the cap and upper rim of the filler neck, but also provides a convenient means for venting the fuel tank. Preferably, the baffle comprises a dome-shaped member protecting downwardly from the cap and defining a vent chamber therebetween. Venting is accomplished by means of at least one vent opening extending through the dome-shaped baffle member into the vent chamber which in turn communicates with the vent passageway formed through the gasket. The passageway in turn leads to a gap or opening created by the dissimilar thread angles on the non-load bearing side or face of the threaded interconnection between the cap and filler neck and then to atmosphere.

The one piece gasket and baffle member is mounted to the inside of the cap by means of a support post projecting downwardly from the cap having an upper end integral with the cap and a lower end adapted to receive and fasten the dome-shaped baffle member.

The fuel cap may also include a splash guard mounted on the support post below the baffle member. Preferably, the splash guard comprises a circular, dome-shaped disc member having it apex connected to the support post.

The fuel cap thus not only provides a cover for closing the end of a filler neck for a fuel tank, but also provides a convenient method of venting the fuel tank directly through a gasket in the cap.

BRIEF DESCRIPTION OF THE DRAWINGS

The drawings illustrate the best mode presently contemplated of carrying out the invention.

In the drawings:

FIG. 3 is an enlarged exploded sectional view of the assembly taken through the plane of the line 3-3 in FIG. 2 showing the cap removed from the filler neck of the fuel tank; and FIG. 4 is a cross-sectional view illustrating the cap threaded onto the filler neck to close off the fuel tank.

DESCRIPTION OF THE PREFERRED EMBODIMENT

Figure 1:
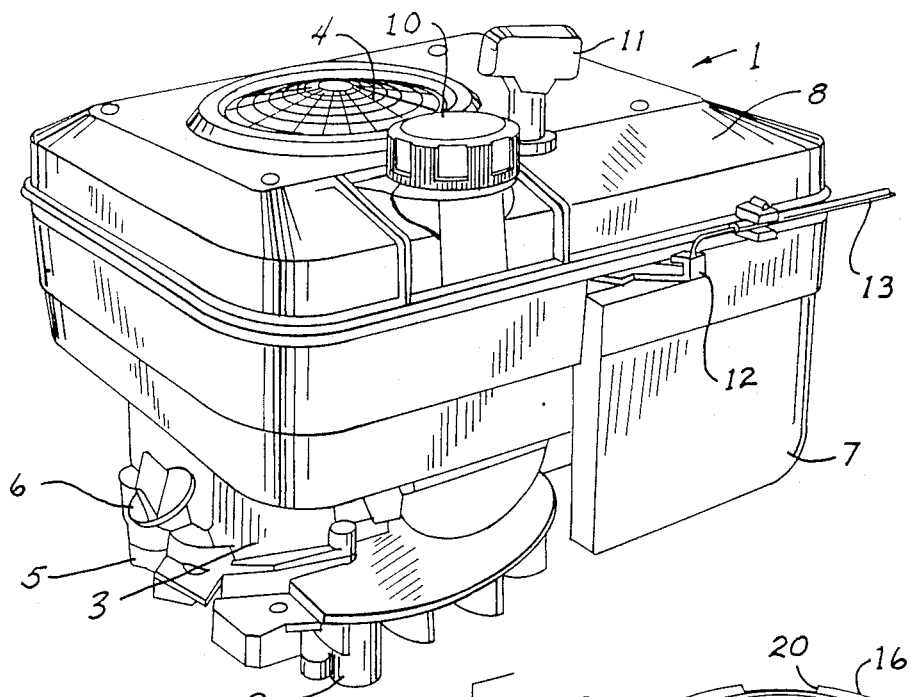
FIG. 1 is a perspective view of an internal combustion engine incorporating a fuel tank assembly in accordance with the present invention.

Referring now to the drawings, FIG. 1 illustrates a small internal combustion engine, generally designated by the numeral 1, for use in connection with lawn and garden equipment, such as lawn mowers. Engine 1 is of the vertical shaft type and includes a crankshaft 2 connected to a piston (not shown) within cylinder 3, and a rotating air filtering screen 4. Oil for cylinder 3 is contained within oil sump 5 which may be filled via removal of an oil fill cap 6. Engine 1 also includes an air cleaner 7, a fuel tank 8 that may be filled with fuel via a filler neck 9 and a cap assembly 10 hereinafter to be described. Fuel tank 8 is composed of a plastic material which reduces the overall weight of engine 1. Engine 1 also includes an optional handle 11 connected to a vertical pull starter rope (not shown), and a pivotally mounted engine speed control lever 12 having one end projecting from engine 1 between air cleaner 7 and fuel tank 8 and its other end operatively connected to the carburetor of engine 1 for controlling the speed of engine 1. A remote speed control cable 13 is typically used with lawn and garden equipment such as lawn mowers to control the speed of engine 1 by pivoting or moving engine speed control lever 12.

Figure 2:
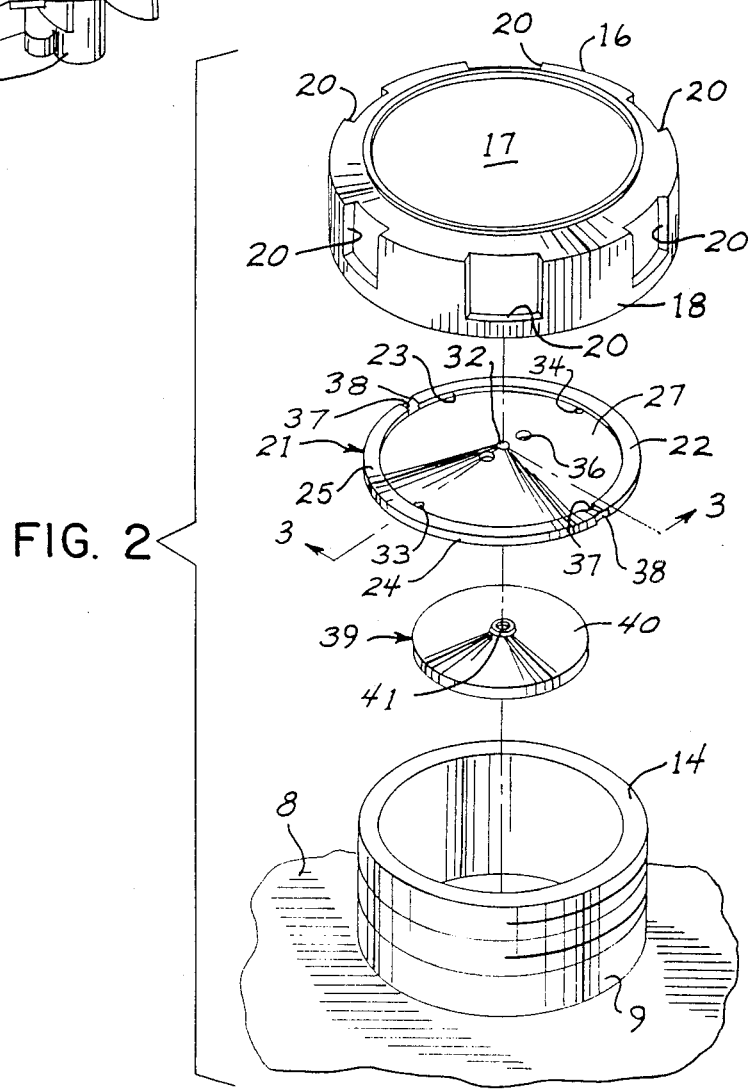
FIG. 2 is an enlarged exploded perspective view illustrating the components of the fuel tank assembly of the present invention.

Referring now to FIGS. 2-4, there is illustrated in more detail the cap assembly 10 for fuel tank 8. As noted above, tank 8 is associated with an internal combustion engine and as such is employed to hold gasoline. Filler neck 9 projects upwardly therefrom and includes a generally circular upper rim 14 with male threads 15 formed in the exterior surface thereof.

Cap assembly 10 includes a generally cup shaped cap or body 16 composed of a cover plate 17 and a integral generally circular depending lower rim or flange 18. A plurality of female threads 19 are formed on the interior surface of lower rim 18 which cooperate with male threads 15 to form a threaded interconnection whereby the cap assembly 10 may be threaded onto filler neck 9. It should be noted that although threads 15 and 19 are illustrated, other methods of removably interlocking cap assembly 10 on filler neck 9 may be employed to provide relative interlocking movement between cap assembly 10 and filler neck 9. Cap 16 also includes a plurality of circumferentially spaced indentations 20 disposed about the exterior surface of lower rim 18 which provide a non-slipping grip for a user's fingers when threading cap assembly 10 on filler neck 9.

A one piece gasket and baffle member 21 is mounted within cap 16. Gasket portion 22 of member 21 includes a flat, annular member having a circular inner peripheral surface 23, a circular outer peripheral surface 24, an upper surface 25 engageable with cover plate 17 of cap 16 and a lower surface 26 engageable with upper rim 14 of filler neck 9. Gasket portion 22 of member 21 is thus utilized to seal the joint at the threaded connection between cap 16 and filler neck 9.

As noted above, member 21 also includes a baffle portion 27 integrally formed with gasket portion 22. Baffle portion 27 comprises a dome-shaped member having its apex spaced from the lower surface of cover plate 17 to define a vent chamber 28 therebetween. Member 21 is mounted to the underside of cap 16 by means of a support post 29 projecting downwardly from cover plate 17 and located centrally thereof. Post 29 includes an upper end integral with cover plate 17 and an opposite lower end 30 of smaller diameter than its upper end and which is joined to the upper end of post 29 by a shoulder 31. Baffle portion 27 in turn includes an opening 32 formed in its apex for frictionally receiving the lower end 30 of post 29. As shown best in FIG. 3, member 21 is positioned so that baffle portion 27 abuts against shoulder 31 of post 29 with gasket portion 29 closely adjacent to the underside of cover plate 17.

As a means for venting fuel tank 8, cap assembly 10 includes a plurality of openings 33-36 formed in baffle member 27 together with a pair of passageways formed through gasket portion 22. As shown best in FIG. 2, openings 33,34 and 35,36 are formed diametrically opposite one another and in alignment with central opening 32. Openings 35,36 are slightly larger than openings 33,34 and provide the primary venting function through baffle member 27. As shown in FIG. 4, openings 33-36 communicate between the interior of tank 8 and vent chamber 28 which in turn communicates with passageway 37 formed through gasket portion 22. Passage 37 communicates between the inner and outer peripheral surfaces 23,24 of gasket portion 22 and is semicylindrical in shape opening to upper surface 25 of gasket portion 22. Passageway 37 thus communicates between vent chamber 28 and threads 15,19. Although threads 15,19 provide a means for interlocking cap assembly 10 on filler neck 9, threads 15,19 do not provide an air tight seal therebetween. Instead, threads 15, 19 are of the buttress type which have been slightly modified in a manner best shown in FIG. 4 to form a gap created by the dissimilar thread angles on the non-load bearing side or face of threads 15, 19. Therefore, this threaded interconnection allows for the escape of gas and for the relief of pressure in order to provide the venting function required for fuel tank 8, as illustrated by the unnumbered arrows in FIG. 4. As shown best in FIG. 2, there are two passageways 37 formed in gasket portion 22 of member 21 each located diametrically opposite one another and approximately 90° from a line passing through the centers of openings 32-36.

Member 21 is composed of a flexible and compressible material such as rubber in order to provide the sealing function necessary between cap assembly 10 and filler neck 9. However, as noted above, passageway 37 are semicylindrical in shape and thus when gasket portion 32 is compressed by cap 16 being threaded onto filler neck 9, as shown best in FIG. 4, passageways 37 do not collapse or compress to a degree which would close off passageways 37. In order to aid in accomplishing this, each passageway 37 includes a notch 38 (see FIG. 2) which ensures their will be insufficient displacement of material around passageways 37 when gasket portion 22 is sealed against upper rim 14 of filler neck 9. Thus, venting of fuel tank 8 is accomplished through gasket 22. It should be noted that baffle portion 27 deflects fuel away from passageway 37 so as to aid in preventing fuel from entering passageways 37. It should also be noted that should fuel enter vent chamber 28 through any of openings 33-36, its dome shape functions to aid in draining the fuel away from passageways 37.

As a further aid in preventing the splashing of fuel into vent chamber 28, cap assembly 10 includes a splash guard 39 mounted on lower end 30 of post 29 below baffle portion 27 of member 21. Splash guard 39 comprises a circular, dome-shaped disc member 40 having a central opening 41 formed in its apex for receiving lower end 30 of post 29. Lower end 30 is peened over as at 42 so as to fasten splash guard 39 and member 21 thereon. It should be noted that the diameter of disc member 40 is less than the diameter of member 21 and thus splash guard 39 functions primarily to prevent fuel from splashing into vent chamber 28 via the larger openings 35,36 in baffle member 27. It should also be noted that the dome shape of disc member 40 and baffle member 27 are arranged such that their wall portions diverge from one another so that any fuel that may enter vent chamber 28 affectively drains away from passages 37 and back into tank 8.

Cap assembly 10 of the invention is an inexpensive construction having no moving parts which effectively closes off fuel tank 8 and separates liquid fuel from fuel vapor. Cap assembly 10 can be installed with new engines, as well as being retrofitted to fuel tanks on existing engines.

Various modes of carrying out the invention are contemplated as being within the scope of the following claims particularly pointing out and distinctly claiming the subject matter regarded as the invention.

I claim:

1. A fuel tank assembly for an internal combustion engine, comprising:
    a fuel tank having a filler neck with a generally circular upper rim;
    a removable cap for closing said filler neck having a cover plate and a generally circular lower rim;
    means on said upper and lower rims for removably interlocking said cap on said fuel tank filler neck by relative interlocking movement between said cap and said filler neck;
    a gasket interposed between said upper rim and said cap, said gasket comprises an annular member having circular inner and outer peripheral surfaces, an upper surface engageable with said cap and a lower surface engageable with said upper rim of said filler neck;
    means for mounting said gasket on said cap; and
    means for venting said fuel tank through said gasket, said venting means comprises a passageway formed through said gasket communicating between said inner and outer peripheral surfaces.

2. The assembly of claim 1, wherein said interlocking means comprises a threaded interconnection.

3. The assembly of claim 2, wherein said threaded interconnection comprises female threads on said lower rim of said cap and male threads on said upper rim of said filler neck.

4. The assembly of claim 1, wherein said annular gasket member is flat in shape and said passageway is semicylindrical in shape and opens to said upper surface.

5. The assembly of claim 4, wherein said annular gasket member further includes a notched formed in said outer peripheral surface communicating with said passageways.

6. The assembly of claim 1 further including baffle means connected to said cap for deflecting fuel away from said passageway.

7. The assembly of claim 6, wherein said baffle means comprises a dome-shaped member spaced from said cover plate and defining a vent chamber therebetween.

8. The assembly of claim 7 wherein said dome-shaped baffle member is integral with said gasket.

9. The assembly of claim 8, wherein said dome-shaped baffle member includes a least one vent opening extending therethrough.

10. The assembly of claim 9, wherein said gasket mounting means comprises a support member projecting downwardly from said cover plate having an upper end integral with said cover plate and a lower end, and fastening means at said lower end for fastening said support member to said baffle member.

11. The assembly of claim 10, wherein said fastening means includes an opening in said baffle member for receiving the lower end of said support member.

12. The assembly of claim 10, further including splash guard means mounted on said support member below said baffle member.

13. The assembly of claim 12, wherein said splash guard means comprises a circular, dome-shaped disc member having its apex connected to said support member.

14. A cap assembly for closing an opening in a fuel tank, comprising:
   a generally cup-shaped cap having a cover plate and a depending flange extending downwardly from the cover plate;
   a gasket mounted on said cover plate; and
   means in said gasket for venting fuel vapors through said gasket, said gasket comprises an annular member having circular inner and outer peripheral surfaces, an upper surface engageable with said cover plate and a lower surface opposite said upper surface, and said venting means comprises a passageway formed through said gasket communicating between said inner and outer peripheral surfaces and further including baffle means connected to said cap for deflecting fuel away from said passageway.

15. The assembly of claim 14, wherein said annular gasket member is flat in shape and said passageway opens to said upper surface.

16. The assembly of claim 15, wherein said annular gasket member further includes a notch formed in said outer peripheral surface communicating with said passageway.

17. The assembly of claim 14, wherein said baffle means comprises a dome-shaped member spaced from said cover plate and defining a vent chamber therebetween.

18. The assembly of claim 17, wherein said dome-shaped baffle member is integral with said gasket.

19. The assembly of claim 18, wherein said dome-shaped baffle member includes at least one vent opening extending therethrough.

20. The assembly of claim 19, further including splash guard means mounted on said cap below said baffle member.

21. The assembly of claim 20, wherein said splash guard means comprises a circular, dome-shaped disc member.

* * * * *

UNITED STATES PATENT AND TRADEMARK OFFICE
CERTIFICATE OF CORRECTION

PATENT NO. :   4,971,219

DATED      :   November 20, 1990

INVENTOR(S) :  Wayne L. Dombeck et al

It is certified that error appears in the above-identified patent and that said Letters Patent is hereby corrected as shown below:

Claim 5, Col. 5, Line 8, delete "notched" and substitute therefore --- notch ---; Claim 5, Col. 5, Line 10, delete "passageways" and substitute therefore --- passageway ---

Signed and Sealed this

Seventh Day of July, 1992

Attest:

DOUGLAS B. COMER

*Attesting Officer*    *Acting Commissioner of Patents and Trademarks*